(12) United States Patent
Osa

(10) Patent No.: US 6,717,613 B1
(45) Date of Patent: *Apr. 6, 2004

(54) BLOCK DEFORMATION REMOVING FILTER

(75) Inventor: Kinya Osa, Chiyoda-ku (JP)

(73) Assignee: United Module Corporation, Los Altos, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/902,330

(22) Filed: Jul. 29, 1997

(30) Foreign Application Priority Data

Aug. 2, 1996  (JP) .............................................. 8-220506

(51) Int. Cl.$^7$ ............................ H04N 5/228; H04N 7/12
(52) U.S. Cl. .................................. 348/222.1; 348/420.1
(58) Field of Search ................................ 348/420, 606, 348/607, 610, 618, 625, 626, 627, 628, 222; 382/261, 264, 268; 358/433

(56) References Cited

U.S. PATENT DOCUMENTS

| | | | | |
|---|---|---|---|---|
| 5,229,864 A | * | 7/1993 | Moronaga et al. | 358/433 |
| 5,337,088 A | * | 8/1994 | Honjo | 348/420 |
| 5,532,745 A | * | 7/1996 | Senda | 348/405 |

* cited by examiner

*Primary Examiner*—Andrew Christensen
(74) *Attorney, Agent, or Firm*—Connolly Bove Lodge & Hutz LLP; Larry J. Hume

(57) ABSTRACT

When pixel signals included in pixel blocks forming an image are supplied, a detector detects the difference between pixel signal levels in the vicinity of block boundary of the pixel blocks. Then, a comparator compares the difference with a threshold value. An adder adds additional values to the pixel signal levels in the vicinity of block boundary in accordance with the comparison results. A pseudo random number is generated, to select a value pattern including the additional values from additional value patterns based on the random number. The above-described process can disturb the regularity of differentials in the pixel block boundary, thus positively facilitating to eliminate block deformation possibly arising in between pixel blocks.

12 Claims, 5 Drawing Sheets

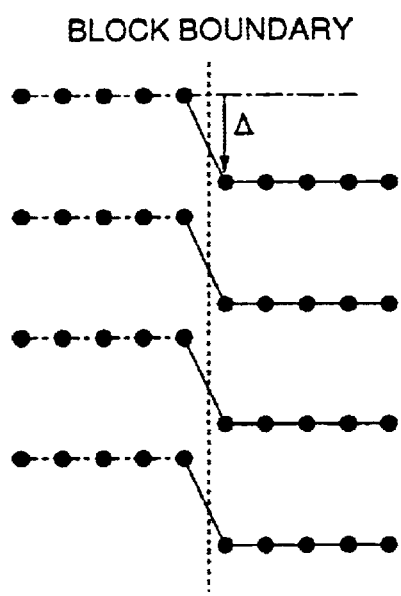 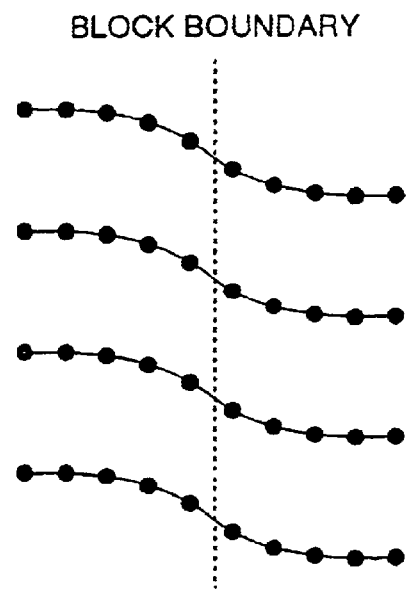
FIG.1A
(CONVENTIONAL)
FIG.1B
(CONVENTIONAL)

BLOCK DEFORMATION REMOVING FILTER

BACKGROUND OF THE INVENTION

This invention relates to a block deformation removing filter, particularly to a block deformation (or blocking noise) removing filter which is used to remove a block deformation (or blocking noise) taking place when for example an image is encoded by compression and the encoded image signal is decoded.

When an image is encoded by compression with high efficiency by way of an image compression coding technique, it may often present an image degradation associated with various compression coding techniques. For example, when an image is encoded by compression in units of block by way of the discrete cosine transformation (DCT), the block boundaries may become discontinuous to each another, thus resulting in block deformation.

The possible block deformation is most outstanding image quality degradation in a visual sense when a compression coding technique is applied in units of block, so that the improvement of the image quality requires minimization or removal of such deformation or discontinuity. So far in order to solve this problem, a decoded image involving a block deformation is filtered by a low-pass filter locally or in the large.

FIGS. 1A and 1B are illustrations showing how to remove the block deformation by way of the low-pass filter. FIG. 1A shows intensity values of decoded image before filtering, while FIG. 1B after filtering. In this connection, FIGS. 1A and 1B respectively show four scanning lines as representation which cross a block boundary in the image at right angle, and the heights of respective lines show intensity levels or values (shown by solid circles) of pixels lined up on each line.

FIG. 1A shows differentials A in intensity level taking place on every line crossing at right angle with the block boundary shown by a dotted line, where the differentials may be slightly different but essentially same, which cause a discontinuous block boundary resulting in a block deformation. Such a block deformation contributes to assume a mosaic pattern of a decoded image in those points, thus causing a significant visual difficulty.

Therefore, as shown in FIG. 1B, possible differentials Δ in the intensity level at the block boundary are smoothed by way of low-pass filter, thereby taking the straight edge off in intensity value, resulting in a minimized block deformation.

However, the process of block deformation removal by way of low-pass filter also removes a necessary high frequency signal component of an original image other than the block deformation, thus causing a blurred image.

Further, when the differentials Δ in the block boundary shown in FIG. 1A are small, the effect acquired by taking off the straight edge shown by the differentials Δ can be very slight than expected, thus resulting in an inadvertent failure of effectively minimizing block deformation.

For example, when the differentials Δ equal "1" in a 256-level image, the pixel value cannot have fractional value so that the favorable effect of low-pass filter can not be expected at all, thereby resulting in a clear visual recognition of block deformation. On the other hand, even a block deformation with such very small differential Δ would be often visible to the eye, so that the filtering by way of low-pass filter which cannot remove a block deformation with a small differential Δ has failed to successfully suppress image quality degradation due to the block deformation.

SUMMARY OF THE INVENTION

To solve the above problems, a purpose of the present invention is to provide a block deformation (or blocking noise) removing filter and its removing method which can not only remove block deformation without affecting the high frequency signal component in an original image, but also successfully remove even block deformation with very small differential value of the signal in the block boundary.

The present invention provides a block deformation removing filter comprising: a detector responsive to pixel signals included in a plurality of pixel blocks forming an image to detect a difference between at least two pixel signal levels in the vicinity of a block boundary of the pixel blocks; a comparator to compare the difference with a threshold value; and an adder to add values to the pixel signal levels in the vicinity of block boundary in accordance with the result of the comparison.

Further, present invention provides a method of filtering an image signal, comprising the steps of: supplying pixel signals included in a plurality of pixel blocks forming an image; detecting a difference between at least two pixel signal levels in the vicinity of block boundary of the pixel blocks; comparing the difference with a threshold value; and adding values to the pixel signal levels in the vicinity of block boundary in accordance with the comparison result.

Further, the present invention provides an image processing apparatus comprising: scanning means for scanning pixel signals included in a plurality of pixel blocks forming an image in a first scanning direction and next in a second scanning direction orthogonal to the first direction with respect to the image; and removing means responsive to the pixel signals scanned in the first or the second direction for removing deformation of the pixel blocks in the first or the second direction, wherein the pixel signals deformation-removed in the first direction are scanned by the scanning means in the second direction, the pixel signals scanned in the second direction being processed by the removing means.

Further, the present invention provides a method of processing an image comprising: scanning pixel signals included in a plurality of pixel blocks forming an image in a first scanning direction with respect to the image; removing deformation of the pixel blocks in the first direction in response the pixel signals scanned in the first direction; scanning the pixel signals deformation-removed in the first direction in a second direction orthogonal to the first direction with respect to the image; and removing deformation of the pixel blocks in the second direction in response the pixel signals scanned in the second direction.

Further, the present invention provides an image processing apparatus comprising: a decoder to decode pixel signals included in a plurality of pixel blocks forming an encoded image; a detector responsive to the decoded pixel signals to detect a difference between at least two pixel signal levels in the vicinity of block boundary of the pixel blocks; a comparator to compare the difference with a threshold value; and an adder to add values to the pixel signal levels in the vicinity of block boundary in accordance with the comparison result.

Further, an image processing apparatus comprising: an encoder to encode predictive error signals of pixel signals included in a plurality of pixel blocks forming an image; a decoder to decode the encoded pixel signals; a detector responsive to the decoded pixel signals to detect a difference between at least two pixel signal levels in the vicinity of block boundary of the pixel blocks; a comparator to compare the difference with a threshold value; an adder to add values to the pixel signal levels in the vicinity of block boundary in accordance with the comparison result; a predictor to generate predictive signals based on output signals of the adder; and a differentiator to calculate differentials of the predictive signals and the pixel signals included in the pixel blocks forming the image.

Further, an image processing apparatus comprising: a decoder to decode pixel signals included in a plurality of pixel blocks forming an encoded image; an adder to add predictive signals to the decoded pixel signals; a detector responsive to output signals of the adder to detect a difference between at least two pixel signal levels in the vicinity of block boundary of the pixel blocks; a comparator to compare the difference with a threshold value; an adder to add values to the pixel signal levels in the vicinity of block boundary in accordance with the comparison result; and a predictor to generate the predictive signals based on output signals of the adder.

BRIEF DESCRIPTION OF THE DRAWINGS

FIGS. 1A and 1B are illustrations showing how the block deformation removing filter of the related art works;

DETAILED DESCRIPTION OF THE PREFERRED EMBODIMENTS

Figure 2:
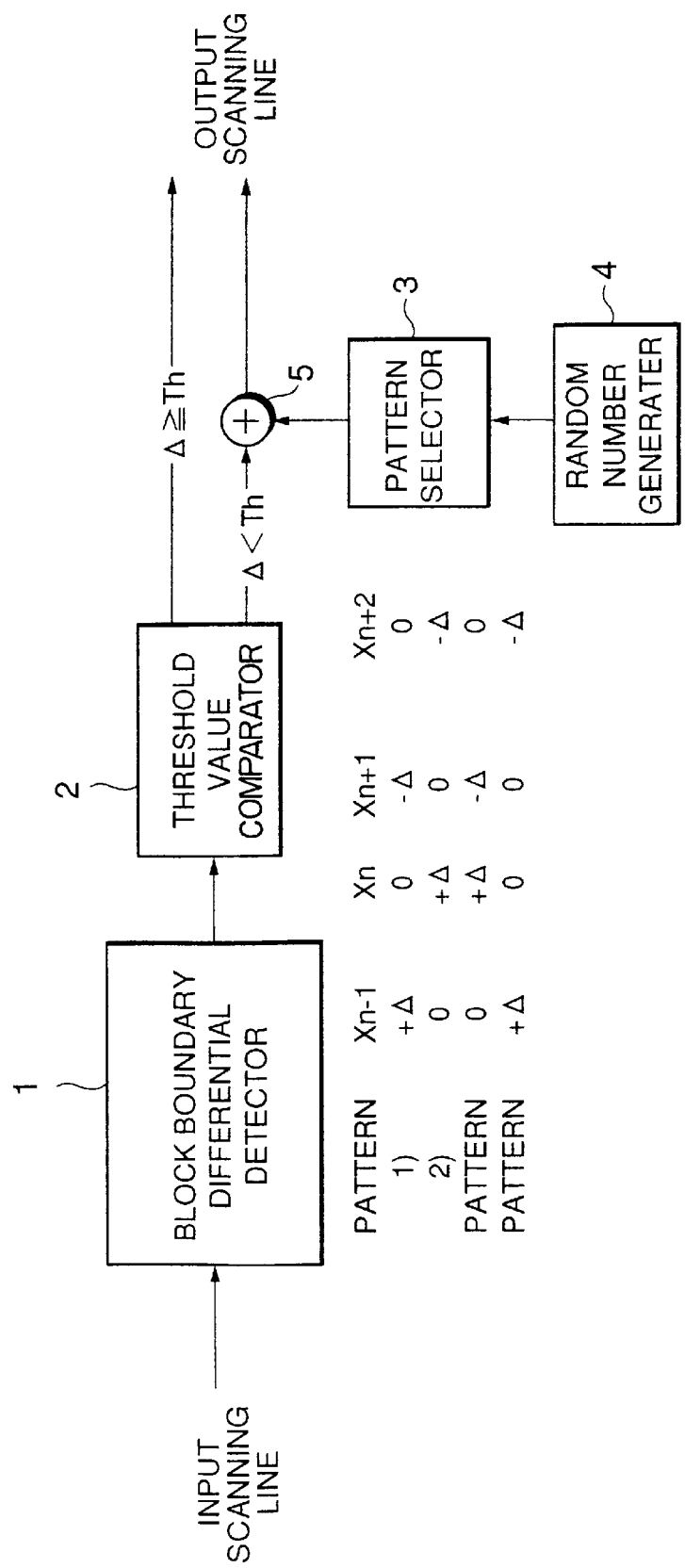
FIG. 2 is a block diagram showing an embodiment of the block deformation removing filter according to the present invention.

FIG. 2 is a block diagram showing an embodiment of the block deformation removing filter according to the present invention. The block deformation removing filter is provided with a block boundary differential detector 1, a threshold value comparator 2, a pattern selector 3, a random number generator 4 and an adder 5.

The block boundary differential detector 1 detects a differential of signal values (e.g., intensity signal levels) at a block boundary in an image (e.g., a decoded image decoded from an image encoded in units of block by way of e.g., DCT) divided into two or more blocks. The threshold value comparator 2 compares the absolute value of the detected differential with a predetermined threshold value, to determine whether the block deformation removing process be performed at the corresponding block boundary.

The pattern selector 3 randomly selects a value pattern among several patterns of value to be added to signal values or levels of the two or more pixels in the vicinity of a block boundary on a scanning line crossing the block boundary at right angle. The random number generator 4 generates a pseudo random number of e.g., two bits. In accordance with the generated random number, the pattern selector 3 randomly selects a value pattern among several patterns. The adder 5 adds additional values selected by the pattern selector 3 to respective signal values of pixels in the vicinity of the block boundary when the threshold value comparator 2 decides that the block deformation removing process should be performed.

Figure 3A:
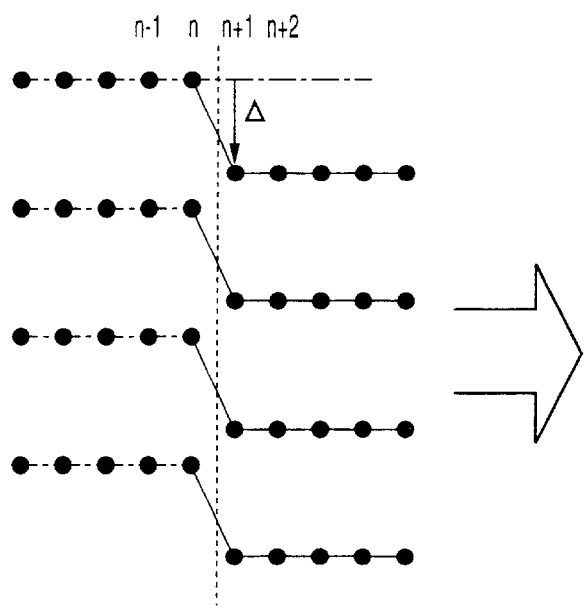
FIGS. 3A and 3B are illustrations showing how the block deformation removing filter according to the invention works.

Detailed description will be made for how the block deformation removing filter shown in FIG. 2 operates referring to FIGS. 3A. 3B and 4 as follows:

As shown in FIG. 3A, when raster scanning is being made in a way crossing the block boundary at right angle (horizontal scanning with respect to an image), it is assumed that a block boundary (shown by a dotted line) is in between pixel positions (n; n+1) on the raster scanning line. In this case, a differential Δ for example of intensity signal levels of both pixels across the block boundary can be represented as follows:

$$\Delta = X_{n+1} - X_n$$

where Xn is a pixel value at pixel position "n".

Figure 4:
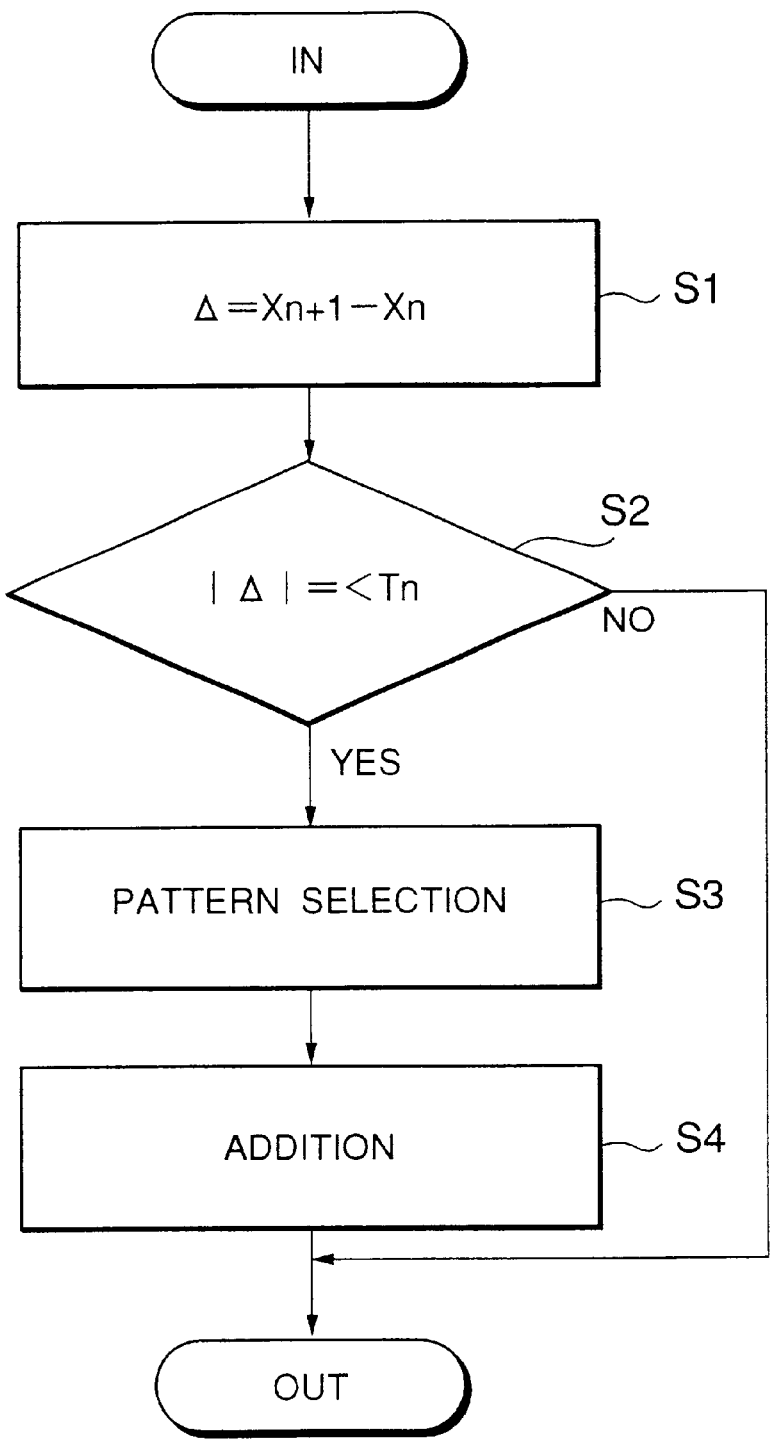
FIG. 4 is a flow chart showing how the block deformation removing filter according to the invention operates.

In the Step 1 in FIG. 4, the differential n is obtained by the block boundary differential detector 1 in FIG. 2.

Then, using the threshold comparator 2, in Step 2, the threshold value comparator 2 compares the absolute value of differential Δ and a specific threshold value Th, to determine which is larger. If the absolute value of differential Δ is smaller than the threshold value Th, it is assumed that here is a block deformation, to advance toward a block deformation removing process to be performed at Step 3 and on. On the contrary, if the absolute value of differential Δ is larger than the threshold value Th, the difference is assumed as an edge component existing in the original image, to output the intensity value on the scanning line as it is.

A block deformation may be a remaining noise basically unexpected, so that in most cases the absolute value of differential Δ is smaller than an edge component possibly existing in the original image. Therefore, the block deformation removing process is to be performed only when the absolute value of differential Δ is smaller than the threshold value Th, while waiver of the removing process is allowed even if the absolute value of differential Δ is larger than the threshold value Th, because most of possible significant block deformations can be expected to be removed.

This waiver is applied rather by practical choice or preference than by theoretical necessity, because the performance of the removing process in that case may cause noise associated with intensity value randomly taken to be larger, thereby uselessly creating an inadvertent danger for degrading the image quality much more. Therefore, theoretically this process may be applied to the entire block boundaries across the board, but this threshold value comparison process introduced by the present invention can not only successfully remove most of the block deformations, but also can prevent otherwise possible inadvertent degradation of image quality from taking place.

In Step 2, when the threshold value comparator 2 judges that the absolute value of differential Δ is larger than the threshold value Th, and that there are some block deformations, the process goes to Step 3 where the random number generator 4 generates a pseudo random number e.g., of two bits. Based on the pseudo random number, the pattern selector 3 randomly selects one pattern of an additional value to be added to signal values of two or more pixels (in this case, four pixel values at the pixel positions n−1, n, n+1, n+2) in the vicinity of block boundary on one scanning line among four patterns as shown below:

| Pattern | Xn−1 | Xn | Xn + 1 | Xn + 2 |
|---------|------|-----|--------|--------|
| 1)      | +Δ   | 0   | −Δ     | 0      |
| 2)      | 0    | +Δ  | 0      | −Δ     |
| 3)      | 0    | +Δ  | −Δ     | 0      |
| 4)      | +Δ   | 0   | 0      | −Δ     |

And, in Step 4, the adder 5 adds additional values with the pattern selected at the pattern selector 3 to the four pixel values Xn−1, Xn, Xn+1 and Xn+2, to output the additional results. For example, when the pattern 1) is selected, +Δ and −Δ are respectively added to the pixel values Xn−1 and Xn+1 for output, but pixel values Xn and Xn+2 are output as they are.

When the above-described pattern selection and additional processing is over for one scanning line, next scanning line is also subjected to the same routine. In this embodiment, a probability of continuously selecting the same pattern for two adjacent scanning lines on the same block boundary is ¼. With such block deformation removing filter as used in the embodiment, because this probability is small, block deformation can be effectively removed by way of disturbing the regularity of signal differentials along block boundaries. In this connection, there is a probability of continuous adoption of the same pattern as described above, however, since the probability is small, such continuous adoption may not impose any visual degradation. When such routine is successively operated per scanning line (four lines in FIG. 3A), as shown in FIG. 3B, the random selection of patterns on each scanning line can remove straight edges of signal differentials in the block boundary, thus minimizing block deformation.

With this embodiment, such a block deformation removing process as described above is performed only when the absolute value of differential Δ is smaller than the threshold value Th and at the same time the area to be applied with the process is limited to within a narrow range including two pixels across the block boundary, thereby allowing the block deformation to be removed without significant impairment of high frequency signal component of the original image. In this connection, an image having such intensity signal levels as shown in FIG. 3B shows some disturbance in levels in the vicinity of block boundary, but the small differentials Δ cannot affect its visual appearance. Objects to be processed according to the invention may not be limited to two pixels across the boundary, but can be successfully applied to three or more pixels. Three or more pixels may have a higher probability with which a same pattern will not be selected, thus resulting in an enhanced removing performance.

Further, according to the invention, block deformation is removed by way of disturbing the straightness (or regularity) of the edges along the pixel block boundary, thereby, even in a case where the differentials Δ are very small (particularly for Δ=1), resulting in an effective removal.

Figure 3B:
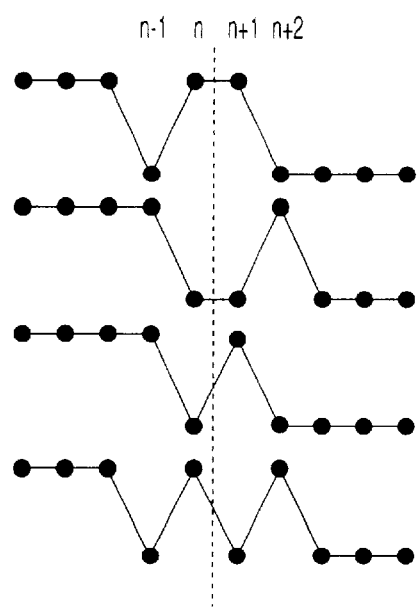

In this connection, block deformation which can be removed by this embodiment has a direction crossing a scanning line at right angle (a horizontal scanning line with respect to an image) as shown in FIGS. 3A and 3B. Therefore, in the case of a rectangle pixel block, a cascade operation along with the processing for a vertical scanning line can treat both block deformations in horizontal and vertical directions.

This block deformation removing in horizontal and vertical directions will be described with reference to FIG. 5.

Image signals of a decoded image stored in an image memory 6 are supplied to a scanning circuit 7. The scanning circuit 7 is switched by a control circuit 8 between the horizontal and vertical scanning modes.

Firstly, the scanning circuit 7 is switched to the horizontal scanning mode. Signals such as intensity signals per horizontal scanning line are supplied to a block deformation removing filter 9 according to the present invention. The intensity signals are processed by the block deformation removing filter 9 as described above with reference to FIGS. 2 to 4.

The processed signals (in which block deformation in the horizontal direction is removed) are fedback to the image memory 6 and again supplied to the scanning circuit 7. The scanning circuit 7 is next switched to the vertical scanning mode by the control circuit 8. The signals per vertical scanning line are supplied to the block deformation removing filter 9 and processed again the same as described with reference to FIGS. 2 to 4.

Figure 5:
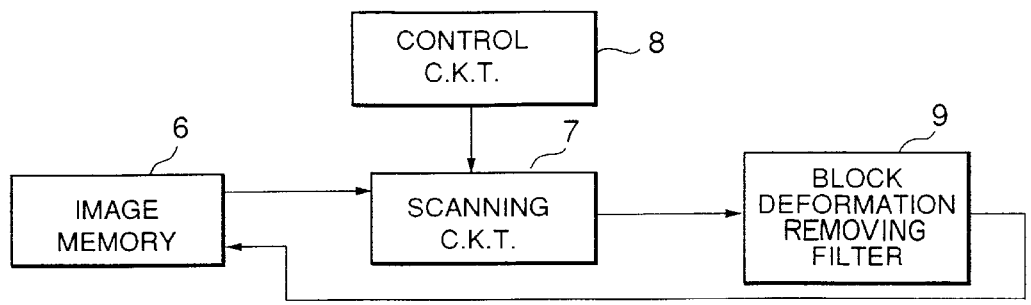
FIG. 5 is a block diagram showing a hardware implementation of the block deformation removing filter according to the present invention.

The description made with reference to FIG. 5 is for the case that the horizontal block deformation removing is conducted first and the vertical block deformation removing next. However, the vertical block deformation removing can be conducted first.

Here, FIGS. 2 to 4, particularly FIGS. 3A and 3B show the case of horizontal scanning. The block deformation removing in vertical scanning is the same as that of horizontal scanning and hence drawings thereof are omitted here.

Figure 6:
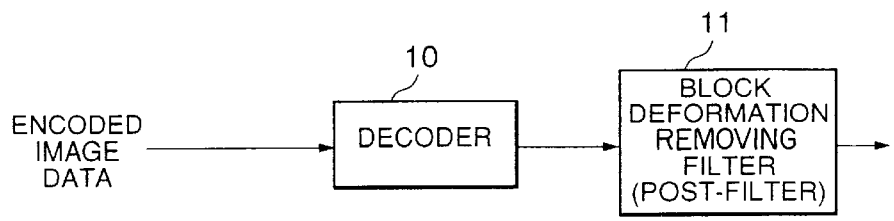
FIG. 6 is a block diagram showing a preferable application embodiment of the block deformation removing filter according to the present invention.

Now detailed description will be made for applications of the block deformation removing filter according to the present invention, when used for still picture encoding, motion picture encoding with/without prediction, referring to FIGS. 6, 7 and 8:

FIG. 6 is a block diagram showing an embodiment of the block deformation removing filter according to the invention, when used for still picture encoding or motion picture encoding without prediction. FIGS. 7 and 8 are block diagrams showing encoding and decoding systems using embodiments of the block deformation removing filter according to the invention, when used for motion picture encoding with prediction.

As shown in FIG. 6, when used for still picture encoding or motion picture encoding without prediction, in a decoding system, the block deformation removing filter is arranged as a post-filter 11 after a decoder 10. Picture data encoded by an encoder (not shown) are decoded at the decoder 10, and then given to the post-filter 11 (block deformation removing filter) to remove block deformation. In this connection, in the case where encoding is made in units of rectangular blocks, the block deformation removing filter according to the invention makes a cascade operation of horizontal scanning line processing along with vertical scanning line processing as shown in FIG. 5.

Further, when used for motion picture encoding with prediction in FIG. 6, the above-mentioned filter 11 can be arranged as post-filter after an encoder (not shown) and the decoder 10. Alternatively, as shown in FIG. 7, it can be arranged as a loop filter 15 for the output of a local decoder 14. In this case, predictive errors encoded by the encoder 13, that is image data, are decoded by the local decoder 14, and block deformation of the decoded image data are eliminated by the loop filter 15 (block deformation removing filter) to be supplied to the predictor 16. Predictive signals generated by the predictor 16 are given to the differentiator 12. The differentiator 12 compares input image signals with the predictive signals, and the differential (predictive error) signals are supplied to the encoder 13.

Figure 7:
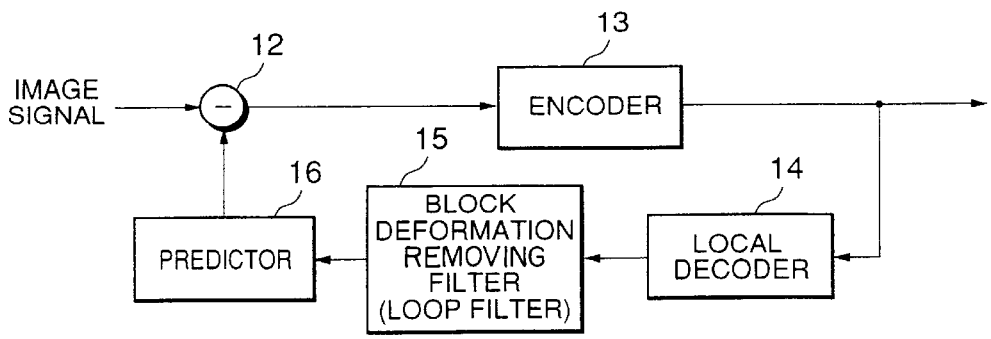
FIG. 7 is a block diagram showing another preferable application embodiment of the block deformation removing filter according to the present invention.
Figure 8:
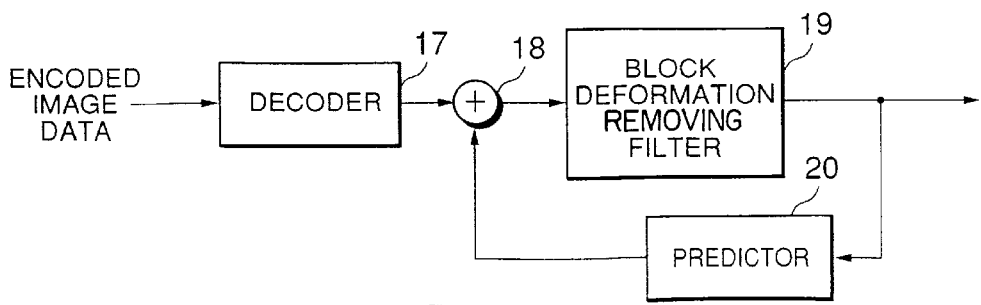
FIG. 8 is a block diagram showing a further preferable application embodiment of the block deformation removing filter according to the present invention.

FIG. 8 shows a configuration of a decoding system accommodating the encoding system shown in FIG. 7. The above-described encoded image data encoded by the encoding system shown in FIG. 7 are decoded by the decoder 17 shown in FIG. 8. The decoded image signals and predictive signals fedback from the predictor 20 are added by the adder 18, and the feedback results are input to the block deformation removing filter 19 according to the present invention, where block deformation is eliminated for again feedbacking to the predictor 20.

Application of the block deformation removing filter according to the invention to both encoding and decoding systems as shown in FIGS. 7 and 8 can obtain much more powerful removing performance than the simple decoding system (shown in FIG. 6) where the filter is used simply as post filter.

As described in detail, the block deformation removing filter according to the invention, first, detects the differential of pixel signal values or levels in the vicinity of the block boundary of two or more pixel blocks forming an image, and, then, compares the differentials with a specific threshold value. In accordance with the comparison results, additional values are added to the pixel signal values in the vicinity of the block boundary. These additional values are randomly selected from a plurality of predefined addition patterns.

A lower probability of selecting a same addition pattern at adjacent scanning lines means a more disturbed regularity of differentials at the pixel block boundary, thereby more positively facilitating an effective removal of block deformation. Therefore, even a block deformation with a small differential of pixel values at block boundary can be effectively removed without impairing high frequency signal component of the original image.

What is claimed is:

1. A block deformation removing filter comprising:
    a detector responsive to pixel signals included in a plurality of pixel blocks forming an image to detect a difference between absolute values of at least two pixel signal intensity levels in the vicinity of a block boundary of the pixel blocks;
    a comparator to compare the difference with a threshold value;
    an adder to add values to the pixel signal levels in the vicinity of block boundary in accordance with the result of the comparison;
    a generator to generate at least a random number; and
    a selector to select a value pattern including said values which are fixed differential values from a plurality of value patterns based on the random numbers.

2. The filter according to claim 1, wherein the comparator compares the absolute value of the difference with the threshold value.

3. The filter according to claim 1, wherein the adder adds the values to the pixel signal levels in the vicinity of block boundary, when the difference is smaller than the threshold value.

4. The filter according to claim 1, wherein the random number is a pseudo random number of two bits.

5. A method of filtering an image signal, comprising the steps of:
    supplying pixel signals included in a plurality of pixel blocks forming an image;
    detecting a difference between the absolute values of at least two pixel signal intensity levels in the vicinity of block boundary of the pixel blocks;
    comparing the difference with a threshold value;
    adding values to the pixel signal levels in the vicinity of block boundary in accordance with the comparison result
    generating at least a random number; and
    selecting a value pattern including said values from a plurality of value patterns based on the random number.

6. The method according to claim 5, wherein the comparing step includes a step of comparing the absolute value of the difference with the threshold value.

7. The method according to claim 5, wherein the adding step includes a step of adding the values to the pixel signal levels in the vicinity of the block boundary when the difference is smaller than the threshold value.

8. The method according to claim 5, wherein the random number is a pseudo random number of two bits.

9. The method according to claim 5, wherein the supplying step includes a step of supplying pixel signals included in the pixel blocks forming the image, per scanning line.

10. The method according to claim 9, wherein the scanning line is horizontal to the image.

11. The method according to claim 9, wherein the scanning line is vertical to the image.

12. A method of processing an image comprising:
    scanning pixel signals included in a plurality of pixel blocks forming an image in a first scanning direction with respect to the image;
    removing deformation of the pixel blocks in the first direction in response to the pixel signals scanned in the first direction;
    scanning deformation of the pixel blocks in the second direction in response to the pixel signals scanned in the second direction by the steps of:
    detecting a difference between the absolute values of at least two pixel signal intensity levels in the vicinity of block boundary of the pixel blocks;
    comparing the difference with a threshold value;
    adding valves to the pixel signal levels in the vicinity of block boundary in accordance with the comparison result;
    generating at least a random number; and
    selecting a value pattern including the values from a plurality of value patterns based on the random numbers.

* * * * *